US012543913B2

(12) United States Patent
Chang et al.

(10) Patent No.: US 12,543,913 B2
(45) Date of Patent: Feb. 10, 2026

(54) MAGNETIC SWEEPER

(71) Applicants: Hsiao-Chi Chang, Changhua County (TW); Chia-Te Wang, Changhua County (TW)

(72) Inventors: Hsiao-Chi Chang, Changhua County (TW); Chia-Te Wang, Changhua County (TW)

( * ) Notice: Subject to any disclaimer, the term of this patent is extended or adjusted under 35 U.S.C. 154(b) by 0 days.

(21) Appl. No.: 18/734,698

(22) Filed: Jun. 5, 2024

(65) Prior Publication Data

US 2025/0375085 A1 Dec. 11, 2025

(51) Int. Cl.
*A47L 13/41* (2006.01)
*B03C 1/02* (2006.01)

(52) U.S. Cl.
CPC ................ *A47L 13/41* (2013.01); *B03C 1/02* (2013.01); *B03C 2201/20* (2013.01)

(58) Field of Classification Search
CPC .................................. A47L 13/41; B03C 1/02
USPC .................................................. 209/215, 228
See application file for complete search history.

(56) References Cited

U.S. PATENT DOCUMENTS 2,954,257 A * 9/1960 Besuch ................ B23Q 3/1546 335/302
6,669,024 B2 * 12/2003 Ottens ....................... B03C 1/30 294/190
2009/0223198 A1 * 9/2009 Nye .......................... H01F 7/04 56/400.11

FOREIGN PATENT DOCUMENTS

CN 109577261 A * 4/2019 ............... E01H 1/14

OTHER PUBLICATIONS

Yuam; Xiaobo, "Portable Iron Removing Dolly Used for Ground Iron Removing in Lithium Battery Workshop" (English Translation), Apr. 5, 2019, worldwide.espacenet.com (Year: 2019).*

* cited by examiner

*Primary Examiner* — Molly K Devine
(74) *Attorney, Agent, or Firm* — Muncy, Geissler, Olds & Lowe, P.C.

(57) ABSTRACT

A magnetic sweeper is provided, wherein the magnetic sweeper includes: a main body; a magnetic mechanism including at least one connector, a magnet unit and a bar, the at least one connector being connected to the main body and movable in a pull direction, the magnet unit being disposed at a side of the at least one connector, the bar being swingably disposed at another side of the at least one connector, and the bar, the at least one connector and the magnet unit being movable with each other in the pull direction; and a handle swingably connected to the main body.

9 Claims, 6 Drawing Sheets

MAGNETIC SWEEPER

BACKGROUND OF THE INVENTION

Field of the Invention

The present invention relates to a cleaning device, and especially to a magnetic sweeper.

Description of the Prior Art

Components, such as nails, screws, nuts, bolts, etc., usually used in factories or construction environments, or metal debris and/or filings generated during processing, are unavoidable to fall to the ground during production, assembly, and processing. This can easily cause unexpected damage to users, devices and/or objects.

However, because the working environment is usually messy, components, metal debris and/or filings on the ground are difficult to be found and cleaned; and during busy work periods, people usually do not have enough time or pay attention to clean and tidy up the working environment, so the people in the working environment might be unavoidably injured.

The present invention is, therefore, arisen to obviate or at least mitigate the above-mentioned disadvantages.

SUMMARY OF THE INVENTION

The main object of the present invention is to provide a magnetic sweeper which can effectively and quickly clean magnetically-attractable objects, on a cleaned surface, such as screws, nails, iron filings, nuts, etc.

To achieve the above and other objects, a magnetic sweeper is provided, wherein the magnetic sweeper includes: a main body; a magnetic mechanism including at least one connector, a magnet unit and a bar, the at least one connector being connected to the main body and movable in a pull direction, the magnet unit being disposed at a side of the at least one connector, the bar being swingably disposed at another side of the at least one connector, and the bar, the at least one connector and the magnet unit being movable with each other in the pull direction; and a handle swingably connected to the main body.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
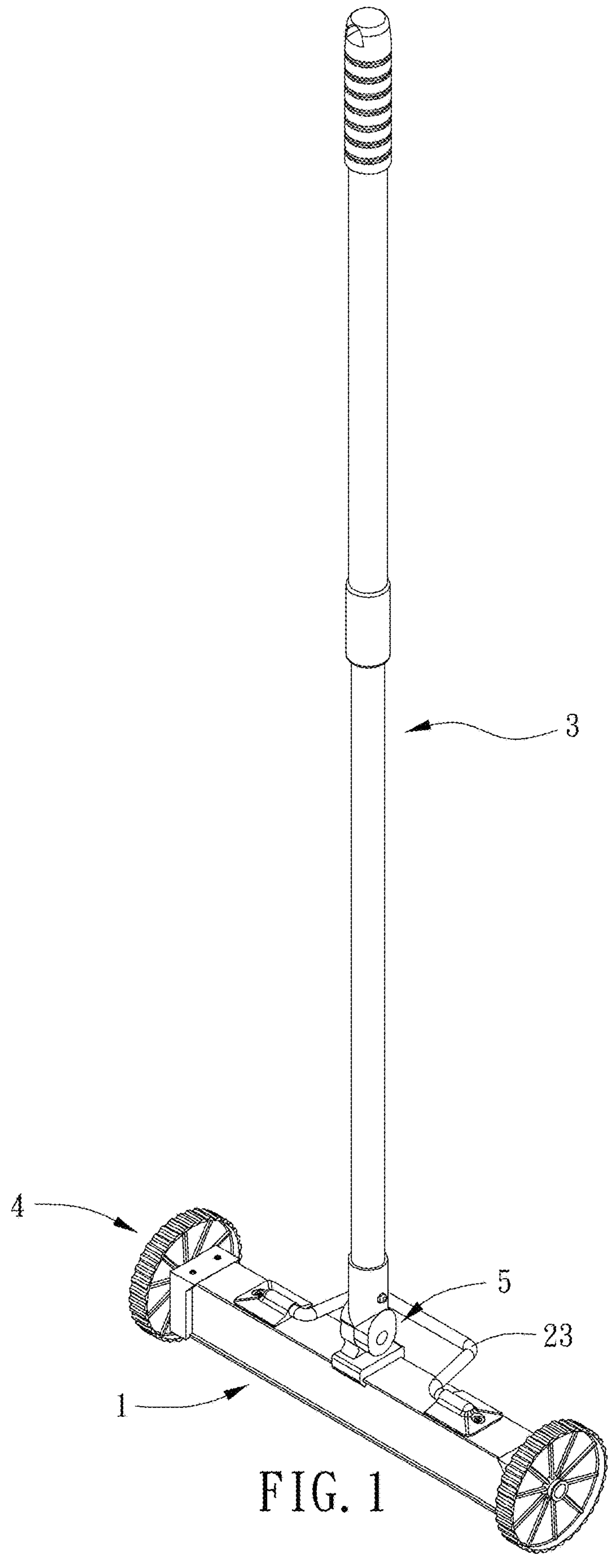
FIG. 1 is a stereogram of an exemplary embodiment of the present invention.
Figure 2:
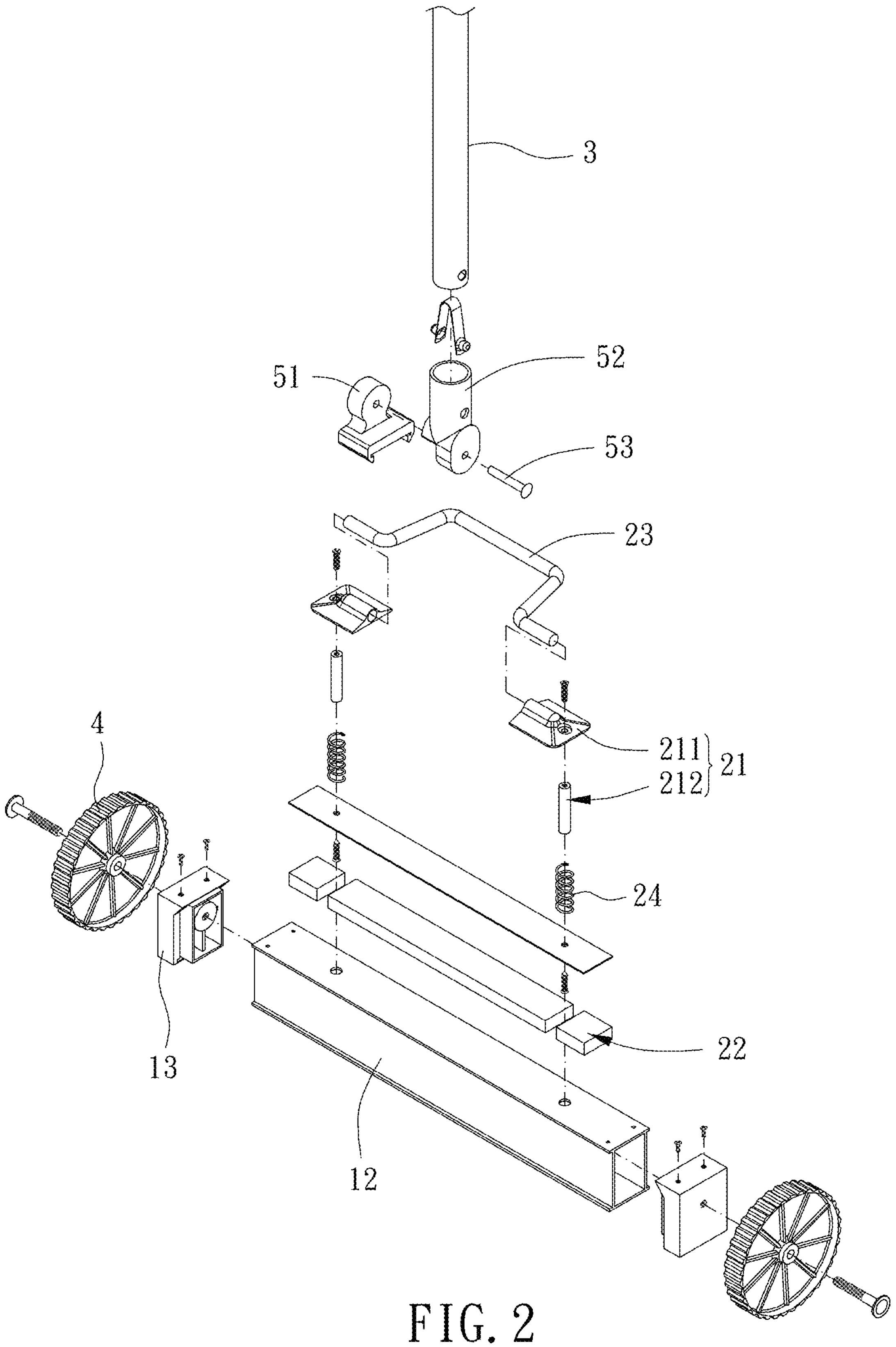
FIG. 2 is a breakdown drawing of an exemplary embodiment of the present invention.
Figure 3:
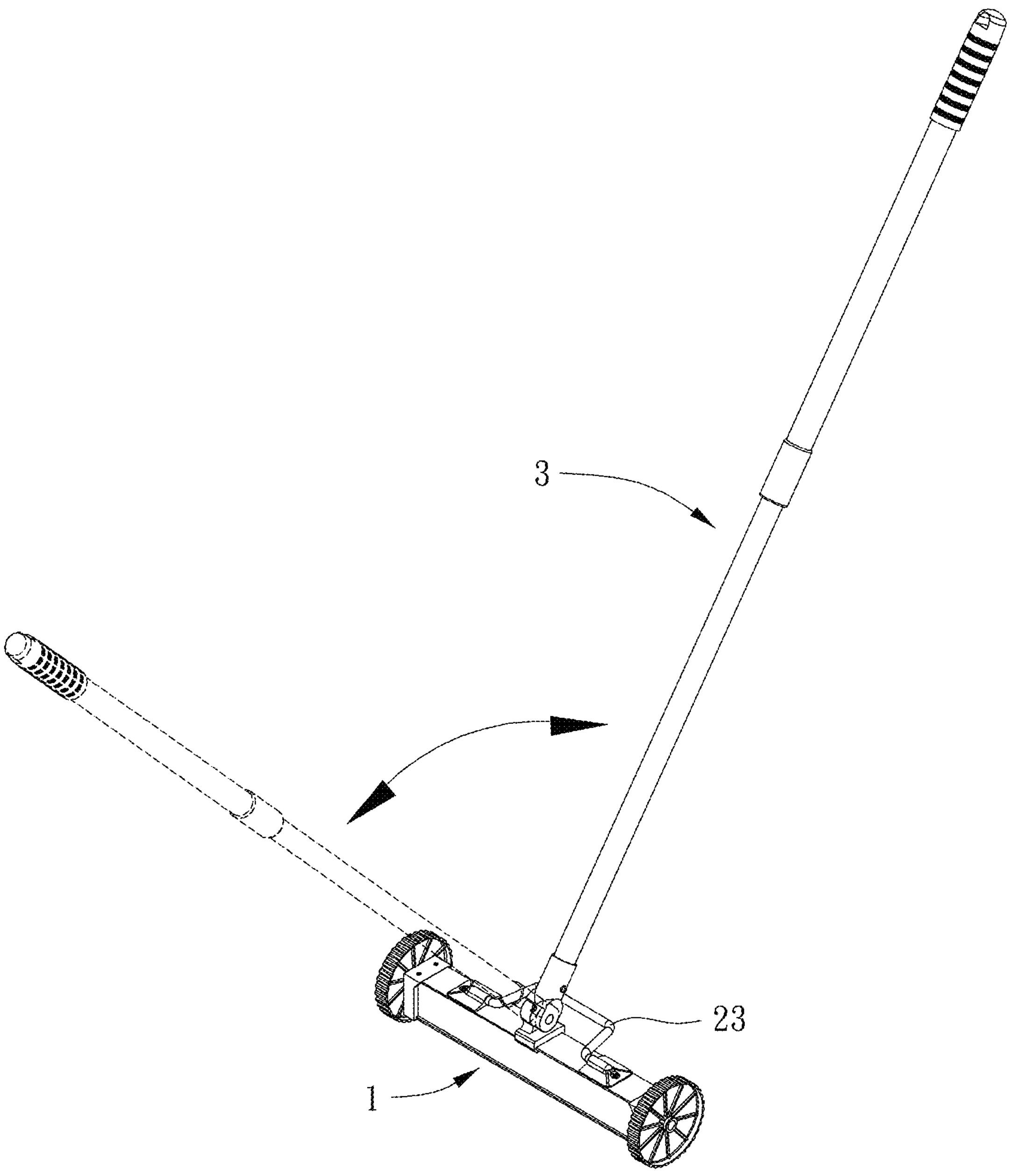
FIG. 3 is a drawing showing a magnetic sweeper with its handle swinging according to an exemplary embodiment of the present invention.
Figure 4:
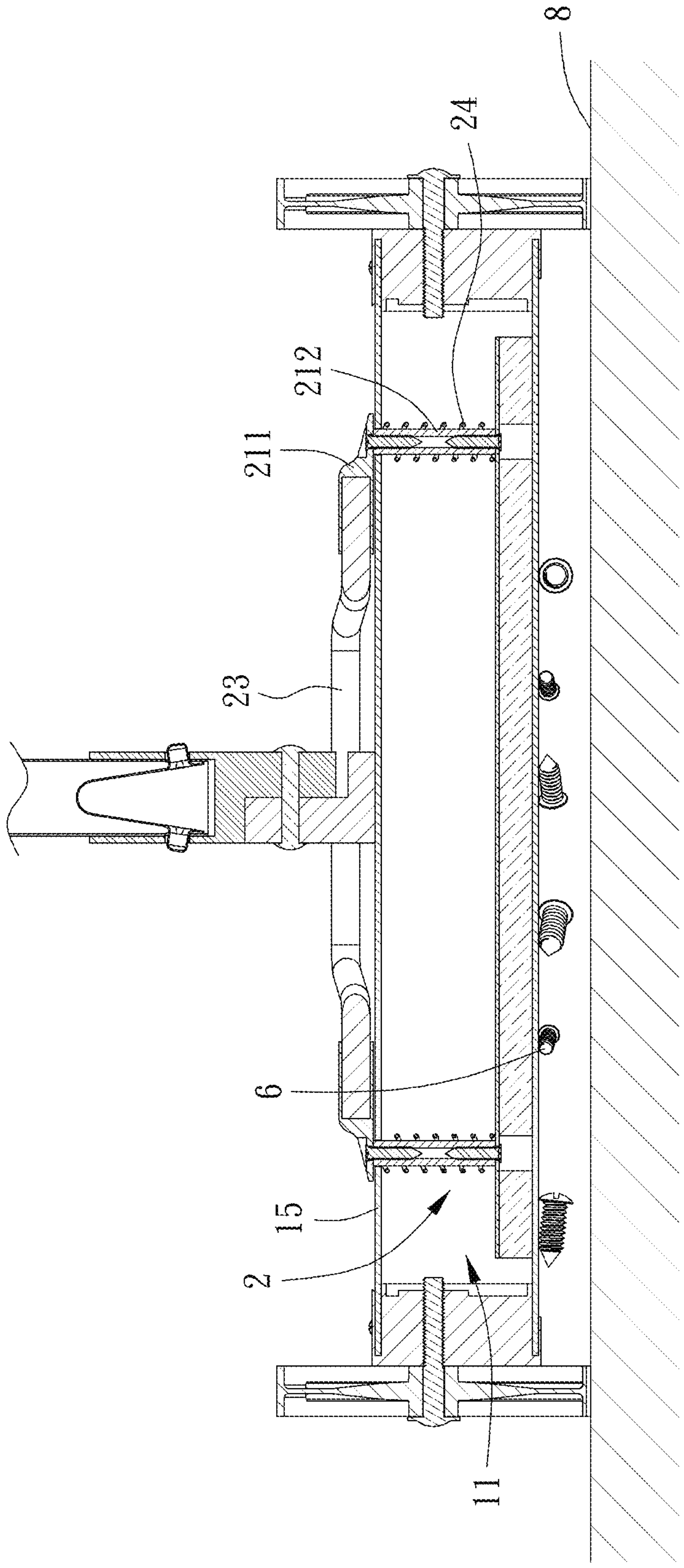
FIG. 4 is a drawing showing a magnet unit attracting magnetically-attractable objects according to an exemplary embodiment of the present invention.
Figure 5:
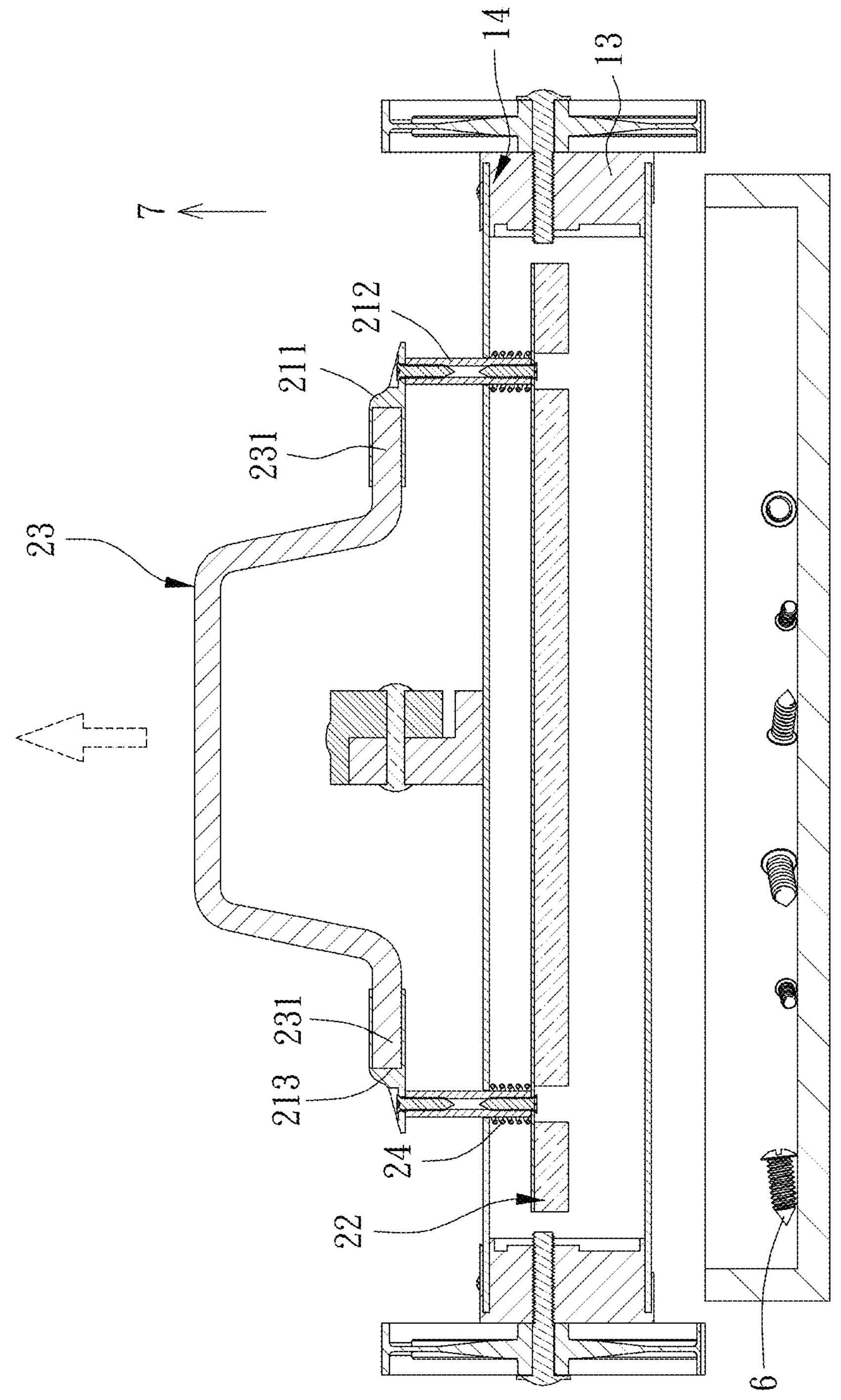
FIG. 5 is a drawing showing the magnetically-attractable objects released from the magnet unit according to an exemplary embodiment of the present invention.
Figure 6:
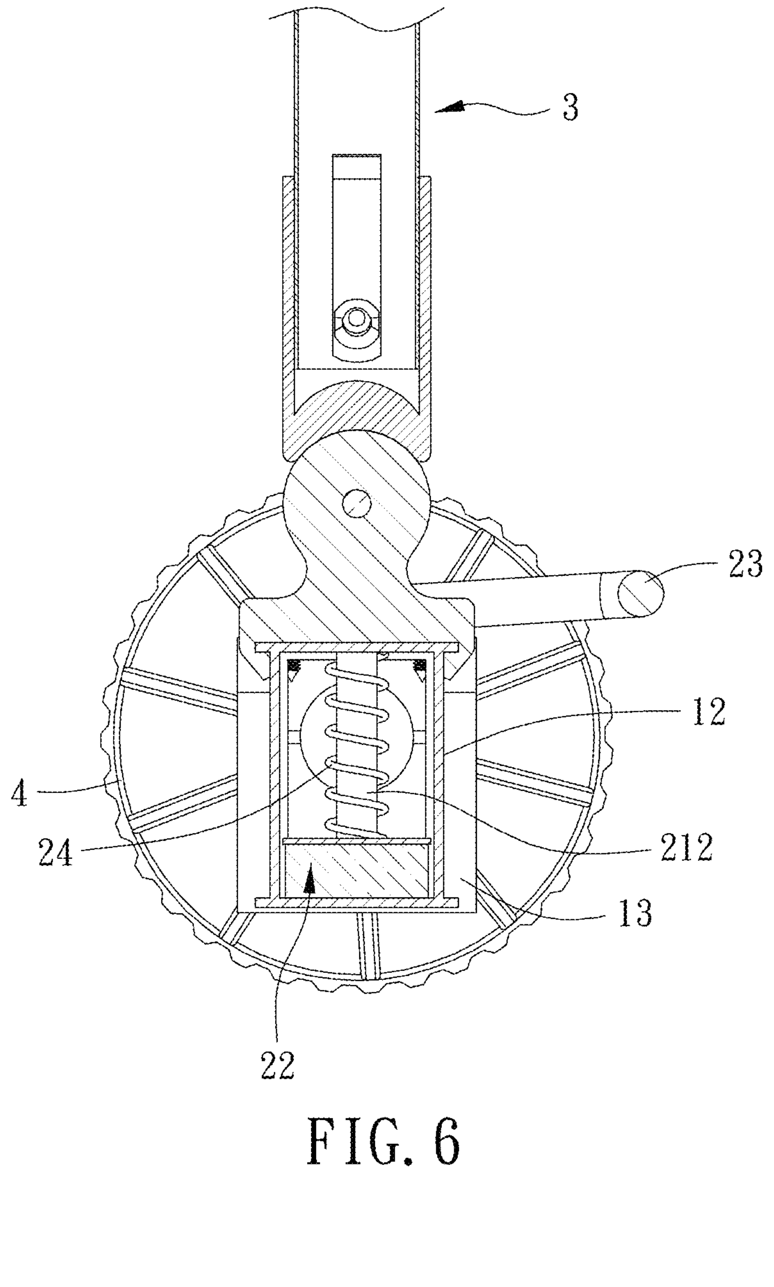
FIG. 6 is a partial enlarged cross-sectional view of an exemplary embodiment of the present invention.

Please refer to FIGS. 1 to 6 for an exemplary embodiment of the present invention. A magnetic sweeper of the present invention includes a main body 1, a magnetic mechanism 2 and a handle 3.

The magnetic mechanism 2 includes at least one connector 21, a magnet unit 22 and a bar 23, the at least one connector 21 is connected to the main body 1 and movable in a pull direction 7, the magnet unit 22 is disposed at a side of the at least one connector 21, the bar 23 is swingably disposed at another side of the at least one connector 21, the bar 23, the at least one connector 21 and the magnet unit 22 are movable with each other in the pull direction 7, and the handle 3 is swingably connected to the main body 1.

The handle 3 which is swingable relative to the main body 1 provides a variety of different angles for users to freely adjust according to various needs. Since the bar 23 is also swingable and an axis which the bar 23 is rotatable about is parallel to an axis which the handle 3 is rotatable about, the bar 23 can be pulled at required one of various angles and be driven by and movable with the handle 3 so that the bar 23 does not impede, limiting the swing movement of the handle 3.

Specifically, the magnetic sweeper further includes a pivot mechanism 5, the pivot mechanism 5 includes a first pivot portion 51, a second pivot portion 52 and a shaft 53, the first pivot portion 51 is disposed on the main body 1, the shaft 53 is disposed through and connects the first pivot portion 51 and the second pivot portion 52, the handle 3 is disposed on the second pivot portion 52, and the handle 3 is rotatable about the shaft 53 relative to the main body 1.

Preferably, the handle 3 is detachably connected to the second pivot portion 52, which is convenient for storage or carrying, and which facilities replacement when the handle 3 is damaged.

Specifically, the main body 1 further includes a connection portion 15, and the pivot mechanism 5 is connected to the connection portion 15. The handle 3 is connected to the connection portion 15, the at least one connector 21 includes a head portion 211 and a body portion 212 connected to each other, the body portion 212 is movable through the connection portion 15 in the pull direction 7, the magnet unit 22 is connected to the body portion 212, the head portion 211 and the magnet unit 22 are located at opposing sides of the connection portion 15 and blocked with the connection portion 15 in the pull direction 7, and at least one end portion 231 of the bar 23 is rotatably inserted in the head portion 211 of the at least one connector 21.

In this embodiment, the at least one connector includes two connectors 21, the two connectors 21 are symmetrically located on opposing sides of the handle 3, the bar 23 is symmetrically arranged relative to the handle 3, a middle portion of the bar 23 is located in a path which the handle 3 is swingable along, the at least one end portion includes two end portions 231, and the two end portions 231 are inserted in the head portions 211 of the two connectors 21, respectively.

The main body 1 includes an internal space 11, and the magnet unit 22 is located in the internal space 11. During cleaning, the magnet unit 22 is located in an attracting position, and at least one magnetically-attractable object 6 (such as screws, nails, iron filings, nuts, etc.) is attracted by the magnetic force of the magnet unit 22 and attached to the main body 1. After the cleaning is completed, the user can place the main body 1 on the collection box and pull the bar 23 to move the magnet unit 22 in the pull direction 7 away from the at least one magnetically-attractable object 6 to a release position. Since the magnet unit 22 is far away from the at least one magnetically-attractable object 6, the at least one magnetically-attractable object 6 will fall from the main body 1 into the collection box due to the gravity, which is quite convenient in operation and use.

In this embodiment, the main body 1 includes a tubular body 12 and two covers 13, the two covers 13 cover opposing ends of the tubular body 12 to define the internal space 11, and a tubular wall of the tubular body 12 is the connection portion 15. Each of the two covers 13 includes an insertion slot 14, and the tubular body 12 is inserted within the insertion slot 14 to increase combinational stability. In the pull direction 7, a ratio of a dimension of the tubular body 12 to a dimension of the magnet unit 22 ranges from 2 to 4, which provides an sufficient space for the magnet unit 22 to move in the pull direction 7. The head portion 211 includes an insertion hole 213 extending in a direction transverse to the pull direction 7, and at least one end portion 231 of the bar 23 is rotatably inserted in the insertion hole 213 of the head portion 211 of the at least one connector 21.

Preferably, the magnetic sweeper further includes a plurality of rollers 4, and the plurality of rollers 4 are connected to the main body 1 and configured to contact a cleaned surface 8. As such, it allows quick movement on the cleaned surface 8 through the plurality of rollers 4 to comprehensively clean the cleaned surface 8. In this embodiment, the plurality of rollers 4 are rotatably connected to the two covers 13, respectively.

Preferably, the magnetic mechanism 2 further includes at least one elastic member 24, and the at least one elastic member 24 is abutted against and between the connection portion 15 and the magnet unit 22. When the bar 23 is pulled by a force and the magnet unit 22 approaches the connection portion 15, the at least one elastic member 24 is compressed, and when the force is removed, the at least one elastic member 24 biases the magnet unit 22 toward a direction away from the connection portion 15 so that the magnet unit 22 can automatically move back to the attracting position. In this embodiment, the at least one elastic member includes two elastic members 24, and each of the two elastic members 24 is disposed around the body portion 212 of one of the two connectors 21.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A magnetic sweeper including:

a main body;

a magnetic mechanism including at least one connector, a magnet unit and a bar, the at least one connector being connected to the main body and movable in a pull direction, the magnet unit being disposed at a side of the at least one connector, the bar being swingably disposed at another side of the at least one connector, and the bar, the at least one connector and the magnet unit being movable with each other in the pull direction; and a handle swingably connected to the main body;

wherein the main body further includes a connection portion disposed on a top side of the main body, the at least one connector includes a head portion and a body portion connected to each other, the handle and the head portion are connected to a top side of the connection portion, the body portion is movable through the connection portion in the pull direction, the magnet unit is connected to the body portion, the head portion and the magnet unit are located at opposing sides of the connection portion, the head portion includes an insertion hole extending in a direction transverse to the pull direction, and at least one end portion of the bar is rotatably inserted in the insertion hole of the head portion of the at least one connector.

2. The magnetic sweeper of claim 1, further including a plurality of rollers, wherein the plurality of rollers are connected to the main body and configured to contact a cleaned surface.

3. The magnetic sweeper of claim 1, wherein the main body includes an internal space, and the magnet unit is located in the internal space.

4. The magnetic sweeper of claim 3, wherein the main body further includes a tubular body and two covers, and the two covers cover opposing ends of the tubular body to define the internal space.

5. The magnetic sweeper of claim 1, further including a pivot mechanism, wherein the pivot mechanism includes a first pivot portion, a second pivot portion and a shaft, the first pivot portion is disposed on the main body, the shaft is disposed through and connects the first pivot portion and the second pivot portion, the handle is disposed on the second pivot portion, and the handle is rotatable about the shaft relative to the main body.

6. The magnetic sweeper of claim 5, wherein the handle is detachably connected to the second pivot portion.

7. The magnetic sweeper of claim 6, wherein further including a plurality of rollers, wherein the plurality of rollers are connected to the main body and configured to contact a cleaned surface; the main body includes an internal space, and the magnet unit is located in the internal space; the main body further includes a tubular body and two covers, and the two covers cover opposing ends of the tubular body to define the internal space; an axis which the bar is rotatable about is parallel to an axis which the handle is rotatable about; the magnetic mechanism further includes two elastic members, and each of the two elastic members is abutted against and between the connection portion and the magnet unit; when the bar is pulled by a force and the magnet unit approaches the connection portion, the two elastic members are compressed, and when the force is removed, the two elastic members bias the magnet unit toward a direction away from the connection portion; the plurality of rollers are rotatably connected to the two covers, respectively; each of the two covers includes an insertion slot, and the tubular body is inserted within the insertion slot; the at least one connector includes two connectors, and the two connectors are symmetrically located on opposing sides of the handle; each of the two elastic members is disposed around the body portion of one of the two connectors; in the pull direction, a ratio of a dimension of the tubular body to a dimension of the magnet unit ranges from 2 to 4; a tubular wall of the tubular body is the connection portion; a middle portion of the bar is located in a path which the handle is swingable along.

8. The magnetic sweeper of claim 1, wherein an axis which the bar is rotatable about is parallel to an axis which the handle is rotatable about.

9. The magnetic sweeper of claim 1, wherein the magnetic mechanism further includes at least one elastic member, and the at least one elastic member is abutted against and between the connection portion and the magnet unit; when the bar is pulled by a force and the magnet unit approaches the connection portion, the at least one elastic member is compressed, and when the force is removed, and the at least one elastic member biases the magnet unit toward a direction away from the connection portion.

* * * * *